Figure 1:
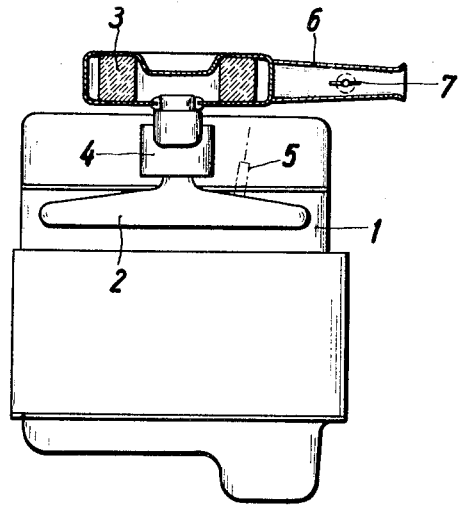

United States Patent

Hensler

[15] 3,678,912

[45] July 25, 1972

[54] INSTALLATION IN INTERNAL COMBUSTION ENGINES FOR PREVENTING THE ESCAPE OF FUEL OUT OF THE MIXTURE FORMATION SYSTEM INTO THE ATMOSPHERE

[72] Inventor: Paul Hensler, Munchingen, Germany

[73] Assignee: Firma Dr.-Inq. h.c. F. Porsche K.G., Stuttgart-Zuffenhausen, Germany

[22] Filed: April 9, 1970

[21] Appl. No.: 26,863

[30] Foreign Application Priority Data

April 11, 1969 Germany ..................... P 19 18 382.5

[52] U.S. Cl. ....................... 123/136, 123/119 R, 123/198 D, 55/DIG. 28, 55/419, 55/420
[51] Int. Cl. .................................... F92m 17/34, F92m 37/00
[58] Field of Search ................... 123/126, 119, 119 F, 198 D, 123/122 D; 55/DIG. 28, 418, 419, 420, 276

[56] References Cited

UNITED STATES PATENTS

| 1,820,795 | 8/1931 | Gordon et al. | 55/420 X |
| 2,994,312 | 8/1961 | Elfes et al. | 123/119 F |
| 3,540,423 | 11/1970 | Tolles | 123/136 |
| 3,093,124 | 6/1963 | Wentworth | 123/136 |
| 3,191,587 | 6/1965 | Hall | 123/136 |
| 3,221,724 | 12/1965 | Wentworth | 123/136 |
| 2,788,086 | 4/1957 | Sebok | 55/419 X |

*Primary Examiner*—Al Lawrence Smith
*Attorney*—Craig, Antonelli & Hill

[57] ABSTRACT

An installation for internal combustion engines to prevent the escape of fuel out of the mixture formation system into the atmosphere, in which combustion air is taken out of the atmosphere by way of a suction pipe with an air filter connected to its inlet and is enriched with fuel, prior to the entry into the combustion spaces, by means of a fuel-feed installation, whereby a closure valve is arranged on the inlet side of the air filter and is actuated by an adjusting device adapted to be automatically engaged in dependence on at least one operating condition of the internal combustion engine.

17 Claims, 3 Drawing Figures

Patented July 25, 1972 3,678,912

Inventor:
PAUL HENSLER

By Craig, Antonelli, Stewart & Hill
Attorneys

INSTALLATION IN INTERNAL COMBUSTION ENGINES FOR PREVENTING THE ESCAPE OF FUEL OUT OF THE MIXTURE FORMATION SYSTEM INTO THE ATMOSPHERE

The present invention relates to an installation in internal combustion engines for preventing the escape of fuel out of the mixture formation system into the atmosphere, especially in an internal combustion engine with carburetion, in which the combustion air is removed from the atmosphere by way of a suction pipe and an air filter connection ahead of the suction pipe and is enriched with fuel by way of a fuel-feed installation prior to the entry into the combustion spaces.

The present invention aims at the creation of a control installation for an intake system, closed in a gas-tight manner, for the combustion air of internal combustion engines.

During the operation of an internal combustion engine, undesired exhaust gases are produced primarily by an incomplete fuel combustion in the cylinder and by lubricating oil mists or clouds reaching the atmosphere. With a stopped internal combustion engine, principally directly after the turning off and particularly with internal combustion engines having a carburetor-type mixture formation, at least a considerable part of the fuel quantity still present in the mixture-formation system evaporates by reason of the contact with the heated-up parts of the suction pipe and of the heat radiated by the internal combustion engine and passing along the mixture formation system. According to a known type of construction of an internal combustion engine (U. S. Pat. No. 3,158,142), the discharge of lubricating oil fumes out of the internal combustion engine is prevented in that a part of the combustion air is sucked through the control housings by way of filters and check valves connected upstream thereof and the lubricating oil mists or fumes occurring in the crankcase and in the control housings are thereby admixed to the combustion air. A further portion of the combustion air is sucked in by way of an air inlet aperture of an air filter mounted on the carburetor whereby a gravity-type closure valve is coordinated to the air inlet aperture which so regulates the air quantity drawn-in by way of the air filter by means of an increase or reduction of the opening cross-section that as large as possible an air quantity is conducted through the control housings. In order to prevent a possible flashing-back of flames out of the mixture formation system into the control housings, so-called snifting or relief valves are interconnected in the suction lines from the control housings to the air filter. These prior art installations are well suited to prevent the escape of lubricating oil mists and fumes out of the crankcase and out of the control housings. However, notwithstanding the considerable expenditure, they are not suited to prevent the evaporation of fuel out of the mixture formation system which occurs, in particular, after stopping or turning-off the internal combustion engine.

In contradistinction thereto, it is the aim of the present invention to create an installation of the aforementioned type in internal combustion engines which prevents with smallest possible manufacturing and installation expenditures and without large structural changes in the mixture formation system or in the internal combustion engine, the escape of any evaporated fuel. The underlying problems are solved in accordance with the present invention in that a closure valve is arranged in the air inlet aperture of the air filter which is adapted to be actuated by an adjusting motor adapted to be automatically engaged by control means in dependence on at least one operating condition of the internal combustion engine. With an appropriate construction of the air filter, the closure valve is advantageously arranged in the suction connection of the air filter. The closure valve is thereby equipped with a snifting or relief valve whose flow cross-section corresponds to the combustion air requirement of the internal combustion engine at partial load so that the starting of the internal combustion engine, for example, by towing, is possible at any time with a closed closure valve. According to a particularly preferred type of construction, the closure valve consists of two support plates held from each other at a distance and of sealing lamellae displaceably arranged between the support plates whose diameter is larger than the cross-section of the suction connection. According to a further feature of the present invention, the adjusting motor associated with or coordinated to the closure valve is constituted by a rotating armature magnet with an adjusting range of 90° which contains a permanent-magnet end-position lock means. Furthermore, provision is made according to the present invention that the energizing circuit for the rotating armature magnet includes a contact in the starter ignition switch and a time-delay relay connected behind the starter ignition switch contact, which brings about a time-delay of the current energization of the electromagnet with respect to the commencement of the starting of the internal combustion engine. Additionally, provision is further made according to the present invention that a vacuum sensor inserted into the suction connection downstream of the closure valve effects in conjunction with a switch, the energization of the rotating armature magnet for the actuation of the closure valve.

The arrangement of the closure valve in the air inlet aperture of the air filter and especially in a suction connection of the air filter permits the complete utilization of the entire volume of the mixture formation installation and principally of the considerable volume of the air filter as evaporating space and as combustion air reservoir during the starting of the internal combustion engine whereby, on the one hand, difficulties are avoided during the hot starting and, on the other, also with a conservative selection of the delay time for the opening of the closure valve, a safe starting of the internal combustion engine is assured. The actuation of the closure valve by an adjusting motor adapted to be automatically engaged by control means assures additionally a rapid adaptation of the closure valve position to the operating condition of the internal combustion engine. Finally, it is to be mentioned as a particular advantage of the present invention that it may be manufactured and installed with smallest possible expenditures and especially without any structural change of the mixture formation system as also of the internal combustion engine itself and is therefore suited particularly favorably for subsequent installation in internal combustion engines already in operation.

Accordingly, it is an object of the present invention to provide an installation in internal combustion engines for preventing the escape of fuel out of the mixture formation system into the atmosphere which avoids by simple means the aforementioned short-comings and drawbacks.

Another object of the present invention resides in an installation for preventing the escape of fuel out of the mixture formation system of internal combustion engines into the atmosphere which is simple in construction, relatively inexpensive to manufacture and install and prevents effectively the escape of fuel vapors occurring immediately after stoppage of the internal combustion engine.

A further object of the present invention resides in an installation of the type described above which not only excels by minimum manufacturing and installation expenditures but also avoids the need for any substantial structural changes in presently existing mixture formation systems and/or internal combustion engines.

Figure 2:
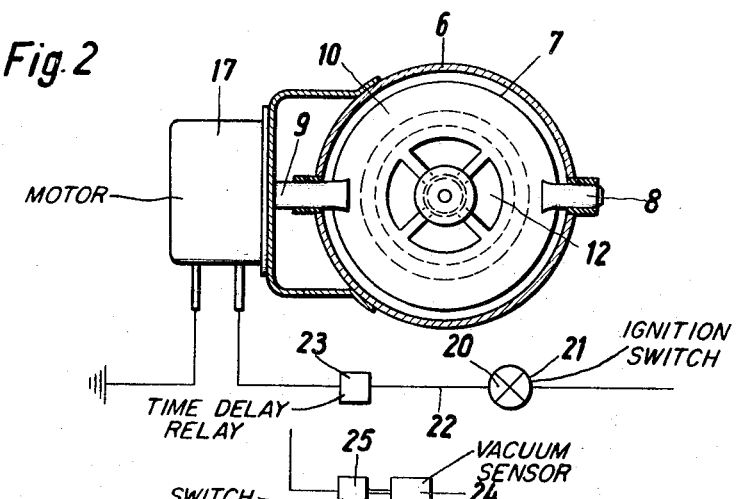
Figure 3:
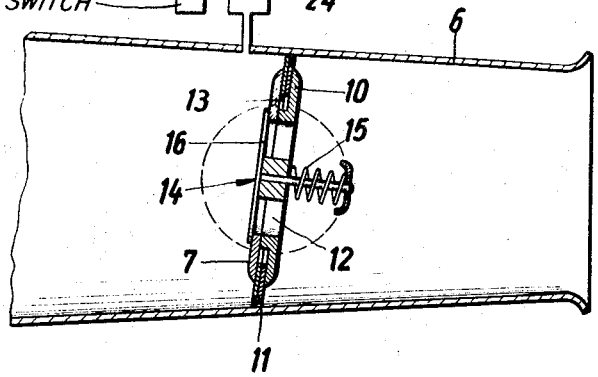

These and further objects, features, and advantages of the present invention will become more obvious from the following description when taken in connection with the accompanying drawing which shows, for purposes of illustration only, one embodiment in accordance with the present invention, and wherein:

FIG. 1 is a side view, partially in cross-section, of a mixture formation system for an internal combustion engine equipped with an installation according to the present invention;

FIG. 2 is a cross-sectional view through the suction connection of an air filter according to FIG. 1, on an enlarged scale, with a schematic illustration of the control means for the engagement of the adjusting motor coordinated to the closure valve; and FIG. 3 is a longitudinal cross-sectional view through a part of the suction connection of the air filter according to FIG. 1 with a closure valve according to the present invention.

Referring now to the drawing wherein like reference numerals are used throughout the various views to designate like parts, and more particularly to FIG. 1, reference numeral 1 designates in this figure the cylinder head of an internal combustion engine serving the purpose of driving a motor vehicle. A suction pipe or manifold 2 is connected to the cylinder head 1. The internal combustion engine sucks-in the combustion air necessary for its operation out of the atmosphere by way of the suction pipe 2 and an air filter 3 connected in the input thereof. Prior to its entry into the combustion spaces, the combustion air is enriched with fuel by a conventional fuel-feed installation which may be constructed either as carburetor 4 or as injection installation 5. In the illustrated embodiment, the air filter 3 is provided with a suction connection 6 in the form of a short pipe stub in which is arranged a closure valve 7 that is pivotally supported by means of two pivot pins 8 and 9 (FIG. 2) about an axis extending transversely to the longitudinal axis of the suction pipe connection 6. The pivot pins 8 and 9 are supported in the wall of the pipe connection 6. The closure valve 7 consists of two spaced support plates 10, held from one another at a distance (FIG. 3), which are connected with the pivot pins 8 and 9, and of sealing lamallae 11 displaceably arranged between the support plates 10, whose diameter is slightly larger than the cross-section of the pipe nipple 6. Both the support plates 10 as also the sealing lamellae 11 are each provided in the central area thereof with a respective aperture 12 and 13. The apertures 12 and 13 of the closure valve 7 are opened and closed by a snifter or relief valve generally designated by reference numeral 14 which includes a closure spring 15 and a valve plate 16, corresponding to the vacuum prevailing in the suction connection 6, whereby the cross-section of the aperture 12 is so dimensioned that the air quantity necessary for the operation of the internal combustion engine at partial load can be sucked-in. Details of the arrangement and construction of the snifting or relief valve 14 are discernible in particular from FIG. 3 while the construction and arrangement of an adjusting motor coordinated to the closure valve actuation are visible in particular from FIG. 2. The adjusting motor acting directly on the closure valve 7 is a conventional electric, rotating-armature magnet 17 with an adjusting range of 90°. A permanent-magnet locking means of conventional construction becomes effective in the end positions of the adjusting range after current interruption. The control of the rotating-armature magnet 17 takes place by way of a contact 20 in the ignition starter switch 21 whereby a time-delay relay 23 is interconnected in the line 22 leading from the starter ignition switch 21 to the rotating-armature magnet 17. Instead of a time delay relay, for example, also a Zener diode with a predetermined breakdown voltage may be interconnected in the line 22, which responds, for example, to the rated voltage at the cut-in rotational speed of the vehicle generator or alternator. It can be seen additionally from FIG. 3 that a vacuum sensor 24 of conventional construction sensing the vacuum in the suction connection 6 and arranged downstream of the closure valve 7 may serve for the purpose of controlling the rotating armature magnet 17, which vacuum sensor 24 acts on a switch 25 for the engagement and disconnection of the current for the rotating armature magnet 17. This type of construction offers the advantage that it does not necessitate any delay installation in the control circuit. For purposes of starting the internal combustion engine, the starter ignition switch 21 is actuated, as is known, whereupon at first the residual gas quantity present in the mixture formation system (suction pipe 2 and air filter 3) is sucked-in by the piston. With a time-delay of about 1 to about 3 seconds, the current flow to the rotating armature magnet 17 is thereafter released by way of the relay 23 whereupon the closure valve 7 pivots through 90° and is retained permanent-magnetically in its new end position.

When stopping the internal combustion engine, the closure valve 7 is closed immediately after the turning-off of the ignition which is initiated by a corresponding current pulse in the line 22. With a closed closure valve 7, the lamellae 11 prevent an evaporation of fuel out of the suction connection 6 into the atmosphere.

While I have shown and described only one embodiment in accordance with the present invention, it is understood that the same is not limited thereto but is susceptible of numerous changes and modifications as known to those skilled in the art. For example, in lieu of the proposed rotary armature magnet, also any other adjusting motor for the actuation of the closure valve may be used. Consequently, I do not wish to be limited to the details shown and described herein but intend to cover all such changes and modifications as are encompassed by the scope of the appended claims.

I claim:

1. An installation in internal combustion engines for preventing the escape of fuel out of its mixture formation system into the atmosphere, in which combustion air is taken out of the atmosphere by way of a suction pipe means constituting the only air inlet path and an air filter meanS connected in the input thereof and is enriched with fuel prior to the entry into the combustion spaces by way of a fuel-feed means, characterized by a closure valve means on the side of the air inlet aperture of the air filter means, said closure valve means being in the closed position when the engine is shut down, and adjusting motor means for actuating the closure valve means, said adjusting means being automatically engaged by way of control means in dependence of at least one operating condition of the internal combustion engine.

2. An installation according to claim 1, characterized in that the internal combustion engine is provided with a carbureting mixture formation.

3. An installation in internal combustion engines for preventing the escape of fuel out of its mixture formation system into the atmosphere, in which combustion air is taken out of the atmosphere by way of a suction pipe means and an air filter means connected in the input thereof and is enriched with fuel prior to the entry into the combustion spaces by way of a fuel-feed means, characterized by a closure valve means on the side of the air inlet aperture of the air filter means, and adjusting means for actuating the closure valve means, said adjusting means being automatically engaged by way of control means in dependence of at least one operating condition of the internal combustion engine, the closure valve means being arranged in the suction connection of the air filter means and including a relief valve means.

4. An installation according to claim 3, characterized in that the closure valve means includes two support plates held from each other at a spacing and of sealing lamellae displaceably arranged between the support plates, the diameter of said lamellae being larger than the cross-section of the suction connection of the air filter means.

5. An installation according to claim 4, characterized in that the adjusting means for the closure valve means is formed by an adjusting motor constituted by an electric rotating armature magnet having an adjusting range of about 90°.

6. An installation according to claim 5, characterized in that said adjusting motor means has a permanent-magnet-type end position lock means.

7. An installation with a starter ignition switch according to claim 6, characterized in that a contact at the starter ignition switch and a time-delay relay connected behind said contact is provided in the energizing circuit for the rotating armature magnet of said adjusting means.

8. An installation with a starter ignition switch according to claim 6, characterized in that a Zener diode with predetermined breakdown voltage is provided in the energizing circuit from the starter ignition switch to the rotating armature magnet of said adjusting means, said breakdown voltage being produced by a means operable in proportion to the engine rotational speed.

9. An installation according to claim 6, characterized by vacuum sensor means inserted into the suction connection downstream of the closure valve means which closes the energizing circuit for energizing the adjusting means for the actuation of the closure valve means by way of a switch.

10. An installation according to claim 9, characterized in that the internal combustion engine is provided with a carbureting mixture formation.

11. An installation according to claim 3, wherein said relief valve means is provided with a cross section corresponding approximately to the combustion air requirement of the internal combustion engine at partial load.

12. An installation in internal combustion engines for preventing the escape of fuel out of its mixture formation system into the atmosphere, in which combustion air is taken out of the atmosphere by way of a suction pipe meanS and an air filter means connected in the input thereof and is enriched with fuel prior to the entry into the combustion spaces by way of a fuel-feed means, characterized by a closure valve means on the side of the air inlet aperture of the air filter means, and adjusting motor means for actuating the closure valve means, said adjusting motor means being an electric rotating armature magnet having an adjusting range of about 90° automatically engaged by way of control means in dependence of at least one operating condition of the internal combustion engine.

13. An installation according to claim 12, characterized in that said adjusting motor means has a permanent-magnet-type end position lock means.

14. An installation in internal combustion engines for preventing the escape of fuel out of its mixture formation system into the atmosphere, in which combustion air is taken out of the atmosphere by way of a suction pipe means and an air filter means connected in the input thereof and is enriched with fuel prior to the entry into the combustion spaces by way of a fuel-feed means, characterized by a closure valve means on the side of the air inlet aperture of the air filter means, and adjusting means for actuating the closure valve means, said adjusting means being automatically engaged by way of control means in dependence of at least one operating condition of the internal combustion engine, the closure valve means being arranged in the suction connection of the air filter means, the closure valve means including relief valve means and two support plates held from each other at a spacing and of sealing lamellae displaceably arranged between the support plates, the diameter of said lamellae being larger than the cross section of the suction connection of the air filter means.

15. An installation internal combustion engines for preventing the escape of fuel out of its mixture formation system into the atmosphere, in which combustion air is taken out of the atmosphere by way of a suction pipe means and an air filter means connected in the input thereof and is enriched with fuel prior to the entry into the combustion spaces by way of a fuel-feed means, the installation including a starter ignition switch, characterized by a closure valve means on the side of the air inlet aperture of the air filter means, and adjusting means for actuating the closure valve means, said adjusting means being automatically engaged by way of control means in dependence of at least one operating condition of the internal combustion engine, and a contact at the starter ignition switch and a time-delay relay connected behind said contact being provided in the energizing circuit for the adjusting means.

16. An installation in internal combustion engines for preventing the escape of fuel out of its mixture formation system into the atmosphere, in which combustion air is taken out of the atmosphere by way of a suction pipe means and an air filter means connected in the input thereof and is enriched with fuel prior to the entry into the combustion spaces by way of a fuel-feed means, the installation including a starter ignition switch, characterized by a closure valve means on the side of the air inlet aperture of the air filter means, and adjusting means for actuating the closure valve means, said adjusting means being automatically engaged by way of control means in dependence of at least one operating condition of the internal combustion engine, and a Zener diode with predetermined breakdown voltage being provided in the energizing circuit from the starter ignition switch to said adjusting means, said breakdown voltage being produced by a means operable in proportion to the engine rotational speed.

17. An installation in internal combustion engines for preventing the escape of fuel out of its mixture formation system into the atmosphere, in which combustion air is taken out of the atmosphere by way of a suction pipe means and an air filter means connected in the input thereof and is enriched with fuel prior to the entry into the combustion spaces by way of a fuel-feed means, characterized by a closure valve means on the side of the air inlet aperture of the air filter means, and adjusting means for actuating the closure valve means, said adjusting means being automatically engaged by way of control means in dependence of at least one operating condition of the internal combustion engine, and a vacuum sensor means inserted into the suction connection downstream of the closure valve means which closes the energizing circuit for energizing the adjusting means for the actuation of the closure valve means by way of a switch.

* * * * *